July 4, 1961  A. R. KLEMM, JR  2,990,669
FRUIT HARVESTER
Filed Dec. 2, 1958  2 Sheets-Sheet 1
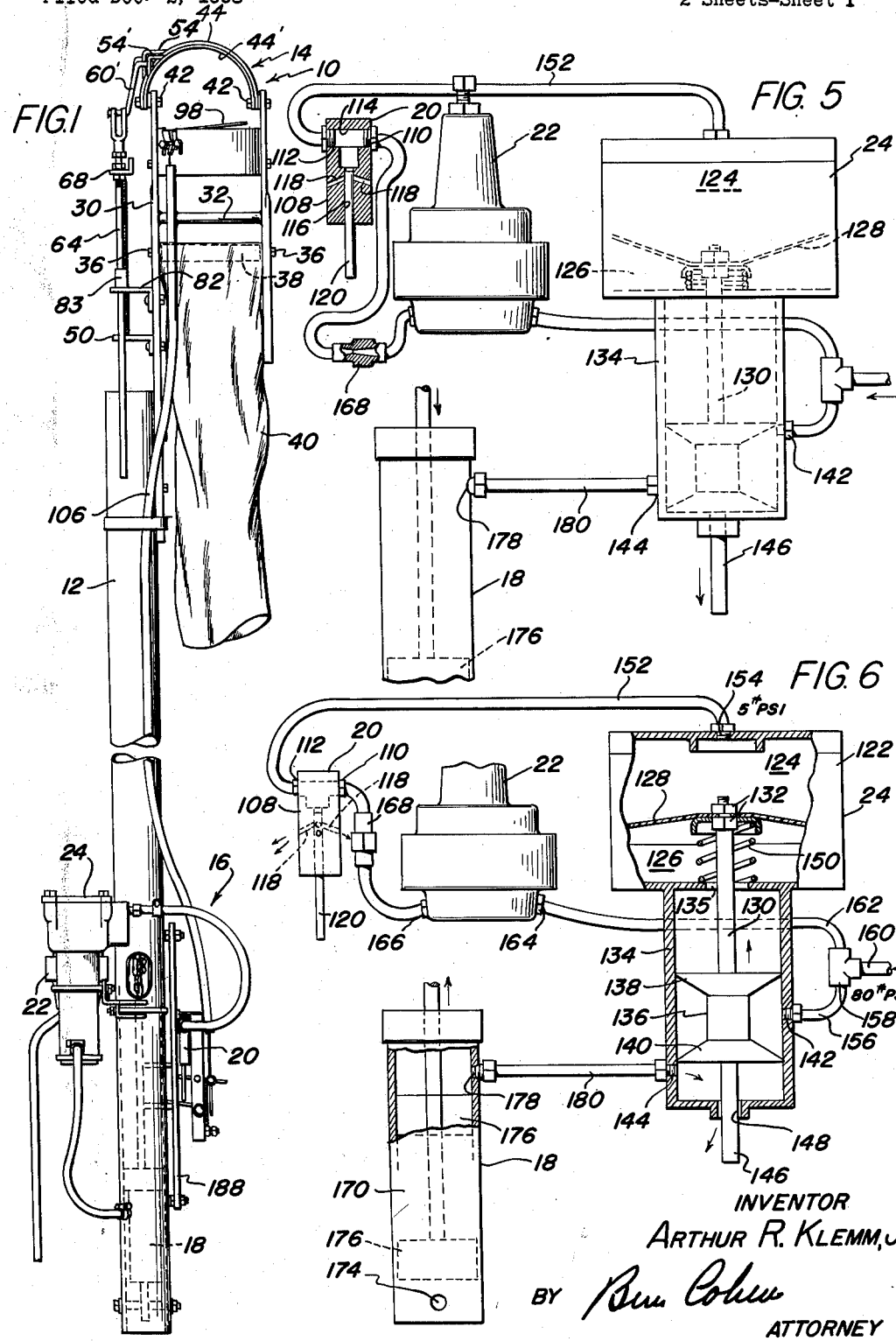
INVENTOR
ARTHUR R. KLEMM, JR.
BY Bun Cohen
ATTORNEY

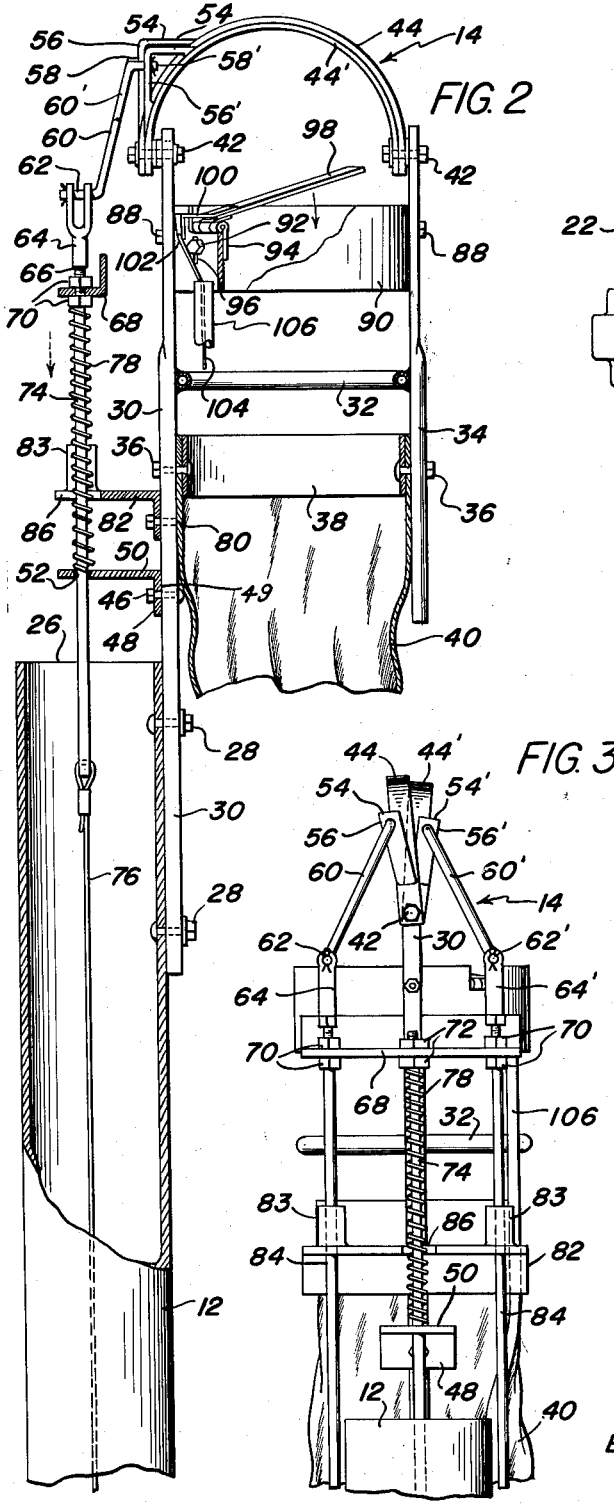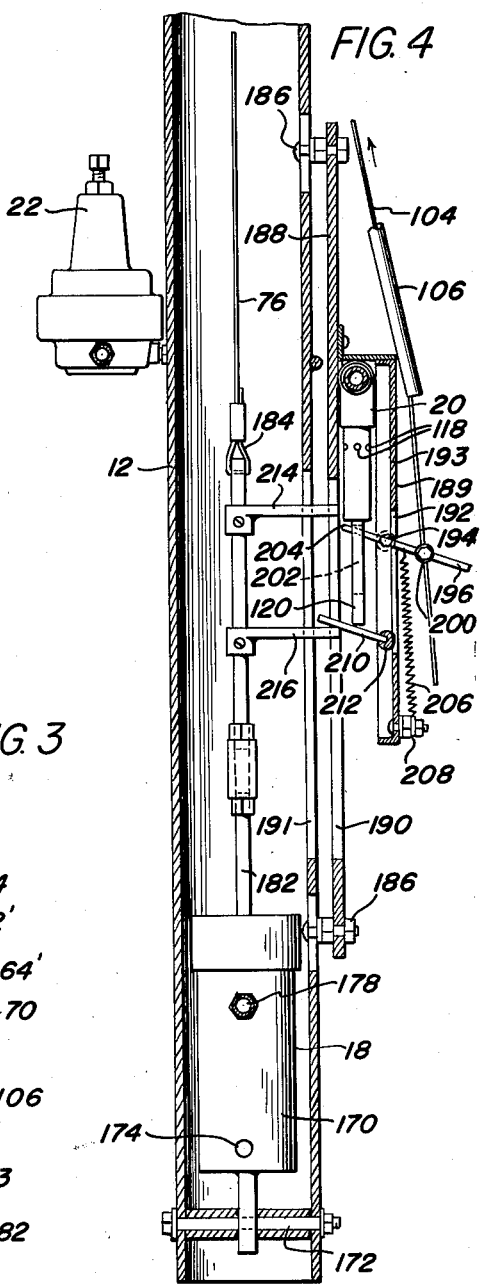
July 4, 1961  A. R. KLEMM, JR  2,990,669
FRUIT HARVESTER
Filed Dec. 2, 1958
INVENTOR
ARTHUR R. KLEMM, JR.
BY
ATTORNEY

United States Patent Office 2,990,669
Patented July 4, 1961

2,990,669
FRUIT HARVESTER
Arthur R. Klemm, Jr., P.O. Box 959, Winter Haven, Fla.
Filed Dec. 2, 1958, Ser. No. 777,696
10 Claims. (Cl. 56—334)

This invention relates generally to the harvesting art and more particularly to an improved fluid pressure operated fruit picker which eliminates manual manipulation of various operating parts and permits the ready and expeditious harvesting of different fruit crops.

A primary object of this invention is to provide an automatically operating fruit picker utilizing a fluid pressure source operating a fluid motor which is controlled by the disposition of a piece of fruit disposed in a position to be severed from the branch of a tree.

Another object of the invention is to provide a novel fluid pressure system controlling a cutter head which includes cutter blades automatically triggered by fruit disposed in an operative position therein, said cutter head including power storing means operative to actuate the cutter blades and the fluid pressure system including structure for automatically supplying the necessary force to the power storing means for overcoming the same to dispose the cutter blades in an operative position for subsequent picking of another piece of fruit.

A more specific object of invention is to provide an automatically operated fruit picker having a pneumatically operated control system utilizing energy-storing means operatively connected to a cutter head incorporating pivoted cutter blades having a scissor action on stems of fruit being harvested, the blades being actuated by the energy-storing means released by the pneumatic control system when fruit is disposed in a position to be cut, and the pneumatic system cooperating automatically with the energy-storing means to replenish or provide additional energy for subsequent cutting operations.

These and other objects will be apparent from the following description and claims taken in conjunction with the accompanying drawings in which:

FIGURE 1 is a side elevation of the novel fruit picker;
FIGURE 2 is an enlarged elevational view of an upper portion of FIGURE 1, with portions broken away and shown in section for purpose of clarity;
FIGURE 3 is an enlarged elevation of an upper portion of FIGURE 1 looking from left to right;
FIGURE 4 is an enlarged view of a lower portion of FIGURE 1 with portions broken away and shown in section for purpose of clarity;
FIGURE 5 is a diagrammatic view of the pneumatic control system of the picker, showing the relative position of parts when the cutter head is cocked prior to picking a piece of fruit; and
FIGURE 6 is a diagrammatic view similar to FIGURE 5 showing the position assumed by the parts of the pneumatic control system when it is activated by a piece of fruit disposed in a picking position.

Referring to the drawings in detail, the novel fruit picker is indicated generally at 10 in FIGURE 1 which includes an elongated tubular support member 12 having mounted on its upper end a cutter head indicated generally at 14. Mounted on the lower end of the member 12 is the automatic pneumatic control system indicated generally at 16 which includes a pneumatic cylinder 18, bleed valve 20, pressure reducer 22 and regulator valve 24.

The various components of the control system are disclosed as being exteriorly of the support member 12. However, it is contemplated that such components may be suitably housed within the support member 12 in the commercial embodiment. Additionally, although the control system in the exemplary embodiment contemplates the use of pneumatic pressure, the scope of the invention is to be considered to encompass the use of hydraulic or sub-atmospheric pressure and thus the term "fluid pressure" is to be interpreted in its broadest context. The support member 12, as seen in FIGURE 2, has an open upper end 26 and has secured thereto by means of fasteners 28 an elongated support rod or bar 30. The bar 30 has integrally secured to an intermediate portion thereof an annular ring 32 to which is secured an elongated rod 34 substantially parallel to the bar 30. Fixed to the bar 30 and rod 34 below the ring 32 by means of fasteners 36 is a collar 38 at the upper end of an elongated flexible tubular conveyor 40 of canvas or any other suitable material for conveying fruit to a suitable container as its stem is severed as will subsequently become apparent. The bar 30 and rod 34 include at their upper ends transverse aligned apertures through which are received coaxial nut-and-bolt assemblies 42 upon which are journaled opposite apertured ends of arcuate cutter blades 44 and 44', the adjacent edges of which being sharpened and capable of being overlapped as seen in FIGURE 3 for severing the stem of a piece of fruit.

Secured transversely to the bar 30 at 46 is one flange 48 of an angle bar 49 which has its laterally extending flange 50 centrally apertured at 52. Extending integrally and laterally from the outer surface of the cutter blades 44 and 44' are L-shaped bracket elements 54 and 54' which include a transversely apertured leg 56 and 56' in which is journaled one end 58 and 58' of Z-shaped links 60 and 60'. The lower ends 62 and 62', respectively, of the links 60 and 60' are parallel to the ends 58 and 58' and are journaled in bifurcated upper ends of guide rods 64. The rods 64 include threaded portions 66 which extend in spaced relation through a support and abutment bar 68 by means of retaining nuts 70. Fixed to the central portion of the bar 68 by means of retaining nuts 72 is the upper threaded end of a rod 74 which extends through the central aperture 52 in the flange 50 of the angle bar. The rod 74 terminates within the tubular support 12, see FIGURE 2, and has secured thereto a flexible force transmitting cable 76 which is operatively connected to the piston rod 182 of the pneumatic cylinder 18, as will subsequently be described. Circumposed about the rod 74 between the nut adjacent the lower surface of the bar 68 and flange 50 is an energy-storing means or power means, or compression spring 78 which will normally urge the cutter blades 44 and 44' into the position shown in FIGURES 1, 2 and 3. Secured transversely of the bar 30 at 80 is a support bar 82 including spaced parallel guide sleeves 83 through which the lower ends 84 of the rods 64 are received. The intermediate portion of the bar 82 is cut out at 86 to accommodate the rod 74 and spring 78 therethrough.

Considering the structure described above, when tension is applied to the rod 74 sufficient to overcome the spring 78 as indicated by the dotted direction arrow in FIGURE 2, the cutter blades 44 and 44' will be pivoted open about the bolts 42 to closed position. The pneumatic cylinder 18 with the cable 76 provides fluid pressure operated force transmitting means, which it will be subsequently observed, will be operated by a suitable pressure source to normally impose the desired tension through the cable 76 to retain the cutter blades open and permit the entering of a piece of fruit therebetween. Release of the force applied by the pneumatic cylinder will permit the energy stored by the compressed spring 78 to be released to forcibly urge the cutter blades into the position shown to sever the stem of a piece of fruit which has triggered the pneumatic control system whereby the cutter goes through one cycle of operation.

As most clearly seen in FIGURES 2 and 3, the bar 30 and rod 34 have secured at 88 a circular support collar 90 having mounted on one side thereof by means of retaining screws 92, only one shown in FIGURE 2, a hinge leaf 94 which is vertically adjustable in slots 96 to accommodate for different sized fruit, i.e. pears, apples, peaches, oranges, etc. The hinge leaf pivotally supports a trigger means or lever 98 extending diametrically across the collar 90, and displaceable downwardly in the direction indicated by the direction arrow on FIGURE 2 when engaged with the piece of fruit being picked. The lever 98 includes a rearwardly extending portion 100 to which is secured at 102 one end of a flexible force transmitting cable or wire 104 conveniently disposed in a suitably supported tubular sleeve 106. Downward displacement of the lever 98 will cause upward movement of the wire 104 for the purpose of activating the bleed valve 20 and operation of the pneumatic cylinder 18 through the control valve 24.

The bleed valve 20, as seen in FIGURES 1, 4, 5 and 6 and conveniently defined as second valve means, comprises a cylindrical body 108 having an inlet and outlet port 110 and 112 communicating with an internal chamber 114. The chamber 114 communicates with a depending bore 116 intermediately communicating with lateral relief passages 118. Reciprocally received in the bore 116 is the upper end of a metering rod 120 which normally prevents communication between the chamber 114 and passages 118 via the bore 116, as seen in FIGURE 5. However, when the upper end of the rod 120 is moved to the position shown in FIGURE 6, communication is permitted between the chamber 114 and passages 118.

The control valve 24, as seen in FIGURES 1, 4, 5 and 6 and conveniently defined as first valve means comprises an upper hollow cylindrical body 122 divided into upper and lower chambers 124 and 126, respectively, by a transverse suitably sealed pressure responsive movable wall or diaphragm 128. A rod 130 is secured centrally of the diaphragm 128 by nuts 132 and extends into a lower cylindrical body 134 at 135. The rod 130 has formed on the lower end thereof a spool valve 136, the annular lands 138 and 140 of which being proportioned to permit communication between lateral ports 142 and 144 in the body 134 when the parts are disposed in the position shown in FIGURE 5, or to permit the port 144 to communicate with the atmosphere when the parts are in the position shown in FIGURE 6. The rod 130 continues below the spool valve in a guide stem portion 146 which extends through an enlarged opening 148 in the bottom of the body 134. Interposed between the diaphragm 128 and the bottom of the body 122 is a suitably rated compression spring 150 normally urging the spool valve to the position shown in FIGURE 6, however, when the upper chamber 124 is subject to a predetermined pressure from via the regulator 22 and bleed valve 20, the spool valve will be retained in the position shown in FIGURE 5.

The regulator 22 is merely a conventional pressure reducing valve which will reduce the operating pressure of approximately 80 lbs. per sq. in. used to operate the pneumatic cylinder 18, to a control pressure of approximately 5 lbs. per sq. in. operating in the upper chamber 124. The outlet port 112 of the bleed valve communicates by means of a conduit 152 with a port 154 of the upper chamber 124. The port 142 communicates with a conduit 156 and T 158 to a suitable source of air pressure via a conduit 160 which may be connected to an air compressor carried by the truck upon which the fruit picker is mounted. The conduit 160 also communicates via the T 158 with a conduit 162 to the inlet 164 of the regulator 22 which in turn communicates reduced pressure from an outlet 166, through restrictor 168 to control flow or volume to the inlet 110 of the bleed valve.

The pneumatic cylinder 18, as seen in FIGURES 1, 4 and 6, includes a casing 170 secured by means of a transverse bolt 172 in the bottom of the support member 12. The casing includes a lower relief port 174 which relieves vacuum or pressure below a piston 176 reciprocably supported in the cylinder. A port 178 in the upper end of the casing 170 communicates through a conduit 180 with the port 144 of the control valve body 134. In the absence of additional structure it will be observed that when the annular lands 138, 140 of the spool valve are disposed in the position shown in FIGURE 5, pressure will be communicated above the piston 176 to urge it to the position shown in FIGURE 5. This will occur since the diaphragm 128 will be subject to a control pressure in the upper chamber 124 overcoming the force of the compression spring 150.

The piston 176 has extending vertically therefrom a piston rod 182, the upper end of which being secured at 184 to the lower end of the flexible cable 76 operating the cutter blades 44 and 44' in the manner previously mentioned. Thus, when the piston is in the position shown in FIGURE 5 the cutter blades 44 and 44' will be spread apart.

The support member 12 as seen in FIGURE 4, has secured at 186 a laterally spaced, elongated support plate 188 which has mounted thereon a channel shaped depending support member 189 which overlies and is in alignment with a longitudinal slot 190 in the support plate and an elongated slot 191 in the member 12. The member 189 includes an elongated slot 192 in its web 193.

Intermediately pivoted at 194 on the side flanges of the member 189 is a rod element 196, and the flexible wire or cable 104 is secured at 200 to the outer end of the rod element 196. The bleed valve 20 is supported between the member 189 and member 188 and the control rod 120 thereof includes an elongated transverse slot 202 therethrough into which projects the inner end 204 of the rod element. A tension spring 206 is secured at its upper end to the rod element 196 between 194 and 200, and the lower end of the spring is secured at 208 to the member 189. When the trigger or lever element 98 is depressed by force of approximately 3 ounces or less, the wire 104 will be urged upwardly pivoting the outer end of the rod element 196 counterclockwise about the pivot 194 and the inner end 204 of the rod element will move downwardly in the slot 202. The pressure in chamber 114 of the bleed valve will act to urge the rod 120 to the position shown in FIGURE 6. This position of the rod 120 will permit air to be exhausted out of chamber 124 of the control valve 24 through the port 112, chamber 114, bore 116 and passages 118. When this occurs, the spring 150 in the control valve 24 will urge the spool valve to the position shown in FIGURE 6 resulting in pressure being relieved above the piston 176 via the port 178, port 144, below the spool valve to the atmosphere at opening 148 about the rod portion 146. When this occurs the spring 78 which was compressed by the pneumatic cylinder is free to urge the cutter blades 44 and 44' into the previously mentioned severing relation to the stem of the piece of fruit which caused initial movement of the trigger or lever 98. The fruit will fall into the tubular conveyor 40. The downward movement of the inner end of the rod element will be in opposition to the tension applied by the spring 206, this spring applying a constant torque to the rod element 196 urging it and the metering rod 120 to the position shown in FIGURE 4 where the bleed valve passages 118 are closed. A rod 210 is pivotally mounted at 212 on the member 189 and is abuttingly engageable with the lower end of the rod 120. The terminal end of the rod 210 extends through the slot 190 of the plate 188 and will normally be retained out of contact with the sides of said slot. The piston rod 182, as seen in FIGURE 4, includes a pair of vertically spaced abutment rods 214 and 216 which extend through the slot 191 in the member 12 and are engageable with the rod 210. As shown, these rods extend into slot 190, flush with the outer face of plate 188 which further serves as a guide means for these rods. When the piston 176 is in its lower position shown in FIGURE 5, the rod 214 will urge the rod 210 about its pivot 212 out of engagement with the lower end of rod 120. Movement by the metering rod 120 downwardly by a piece of fruit depressing trigger 98 and moving rod 196 via wire 104, causes the piston rod 182 to rise to the force of the blade-activating spring 78. This results in the abutment rod 216 engaging rod 210 against metering rod 120 and thus closing apertures 118. This will cause a pressure to build up in chamber 124 of the control valve and movement of the spool valve 136 from the position of FIGURE 6 to that of FIGURE 5. When this occurs pressure will build up above the piston 176 and it will move downwardly, against the pressure of spring 78 to re-cock the blades 44 and 44'. Pressure below the piston 176 is relieved at 174 to permit such movement. As the piston and its rod 182 move down the abutment rod 214 will engage the rod 210 and move it away from the lower end of the metering rod. The piece of fruit will have already been cut at its stem and tension will no longer be imposed on wire 104 to overcome the spring 206 and thus the spring 206 will be effective to retain the rod in the position shown in FIGURES 4 and 5. In review, the novel fruit picker, includes an elongated support member 12 having at its upper end a cutter head 14 including a pair of scissor type cutter blades 44, 44'. Disposed below the blades is an elongated flexible tube 40 of canvas or the like for conveying by gravity fruit which has been severed at the stem. The cutter blades are normally retained in a cocked position by a pneumatic cylinder 18 subject to sufficient pressure to compress a compression spring 78 operatively connected to the cutter blades by means of a suitable linkage. Release of pressure in the pneumatic cylinder 18 permits the cutter blades to be forcibly urged toward each other by the compression spring in a scissor action to sever the stem of a piece of fruit. Activation of a cutting and recocking cycle of the fruit picker is accomplished initially by the engagement of a piece of fruit with a displaceable trigger element 98 adjacent the cutter blades, the trigger element transmitting force to an air bleed valve 20 which operates a control valve 24 permitting the pressure to which the pneumatic cylinder is normally subject to be temporarily exhausted, thus enabling the compression spring to activate the cutter blades. Movement of a piston rod 182 extending from or out of the cylinder by the compression spring results in closing of the bleed valve metering pin 120 subjecting the pneumatic cylinder to a predetermined pressure through the control valve which includes a pressure responsive movable wall 128 which will be subjected to a control pressure from the bleed valve, the pressure responsive movable wall reorienting a control valve spool 136 which once more controls the application of pressure to the pneumatic cylinder.

In view of the foregoing, it should be apparent that the blades 44 and 44' are normally retained apart due to tension applied by the pneumatic cylinder 18 and the spring 78 will be compressed or have energy stored therein to operate the cutter blades. Depression of the lever or trigger 98 causes pressure to be relieved in the cylinder 18 via the bleed valve 20 and control valve 24. After the fruit is cut at its stem, pressure will automatically build up in the pneumatic cylinder due to the repositioning of the control spool in the valve 24 and the harvester will be recocked for a subsequent cycle of operation. The construction shown embodies the invention in a preferred form, but it is intended that the disclosure be illustrative rather than definitive, the scope of the invention being defined in the appended claims.

Having thus described the invention, what is claimed is:

1. An automatic fluid-pressure operated fruit picker comprising a support member, a cutter head at one end of said support member including cutter blade means operative for severing fruit at its stem, a fluid-pressure operated control system operatively connected to said cutter blade means, said control system including energy storing means normally urging said cutter blade means to an operative position for severing the stem of fruit being harvested, fluid-pressure operated force transmitting means operatively connected to said energy storing means for retaining the same in a condition effective to operate said blade means when released, first valve means in communication with a fluid pressure source and operatively connected to said force transmitting means for energizing the same after the energy storing means has been released, second valve means operatively connected to and controlling operation of said first valve means for deactivating and activating the same, and trigger means in said cutter head operatively connected to said second valve means and said force transmitting means and activated in response to pressure imposed by fruit being picked for activating said second valve means which deactivates said force transmitting means via said first valve means and reactivates said force transmitting means after a piece of fruit has been harvested.

2. The structure as in claim 1 in which said cutter blade means comprises a pair of pivotal blade members having a scissor-type cutting action, said force transmitting means comprising a fluid motor acting through said energy storing means to hold said blade members in spaced relation, said trigger means comprises a lever element displaceably supported below said blade means, and second force transmitting means connected between said lever element and second valve means for operating the same when the weight of fruit displaces said lever element.

3. The structure of claim 2 in which said energy storing means comprises a spring between said blade means and said first mentioned force transmitting means and normally disposed in a compressed condition in opposition to force exerted by said activated first mentioned force transmitting means.

4. The structure of claim 1 in which said force transmitting means comprises a pneumatically-operated fluid motor, said first valve means is operatively connected between said pneumatically-operated fluid motor and a power source, said first valve means being subject to a control pressure from said second valve means for maintaining or interrupting communication between said power source and pneumatic fluid motor, said second valve means is a bleed valve operatively connected to said trigger means and said first valve means for activating or deactivating said first valve means and allowing for cutting off communication between said power source and pneumatically-operated fluid motor.

5. An automatic fluid-pressure operated fruit picker comprising power operated blade means, power means operatively connected to said blade means and normally urging said blade means toward a cutting position, fluid pressure operated motor means operatively connected to said power means for normally preventing said power means from operating said blade means, fruit-activated trigger means operatively associated with said blade means for starting a cycle of operation of the picker, and a fluid pressure control system operatively connected to and operating said trigger means and controlling the operation of said motor means for automatically performing a cycle of operation in which said motor means is deactivated to permit said power means to operate said blade means whereby a piece of fruit is severed at its stem and automatically re-activates said motor means for a subsequent harvesting operation.

6. The structure of claim 5 in which said fluid pressure control system comprises a control valve for directing a differential fluid pressure to said motor means in opposition to said power means, a bleed valve operatively connected to said control valve metering fluid pressure to the same for operating the power means in one portion of the cycle of operation and relieving fluid pressure therefrom during another portion of the cycle of operation, control means extending from said bleed valve to said trigger means for activating a cycle of operation, and reset means operatively connected between said motor means and control means for resetting said bleed valve in response to deactivation of said motor means and activation of said power means.

7. The structure of claim 6 in which said bleed valve comprises a metering pin biased toward an operative position and subject to the force of gravity and fluid pressure, exhaust passages controlled by said metering pin in response to orientation of said trigger means, said reset means including abutment pins movable with an operative portion of said motor means and operable to reorient said metering pin to a position permitting reactivation of said motor means.

8. The structure of claim 7 in which said control valve includes a control chamber including a pressure-responsive movable wall and spool valve, said control chamber being subject to control by said bleed valve and said spool valve controlling pressurized fluid directed to said motor means.

9. The structure of claim 8 in which said motor means comprises a pneumatic cylinder-and-piston, said power means comprises a spring, and said blade means comprises a pair of blades affording a scissor-type cutting action.

10. The structure of claim 5 in which said trigger means comprises a pivoted lever disposed below said blade means, said control system includes a bleed valve, a control valve subject to control by said bleed valve, and force transmitting means operatively connected between said pivoted lever and said bleed valve for initiating a cycle of operation of said picker, and a second force transmitting means between said motor and power means for completing a cycle of operation of the picker.

References Cited in the file of this patent

UNITED STATES PATENTS

| | | |
|---|---|---|
| 467,687 | Matlock | Jan. 26, 1892 |
| 541,142 | Wyble | June 18, 1895 |
| 2,288,682 | Chittenden | July 7, 1942 |
| 2,775,088 | Bullock | Dec. 25, 1956 |